2 Sheets—Sheet 1.

D. SAGER.
Harvester.

No. 207,554. Patented Aug. 27, 1878

WITNESSES
F. L. Ouraud
H. A. Toulmin

By his Attorneys

INVENTOR
Daniel Sager
Alexander Mason

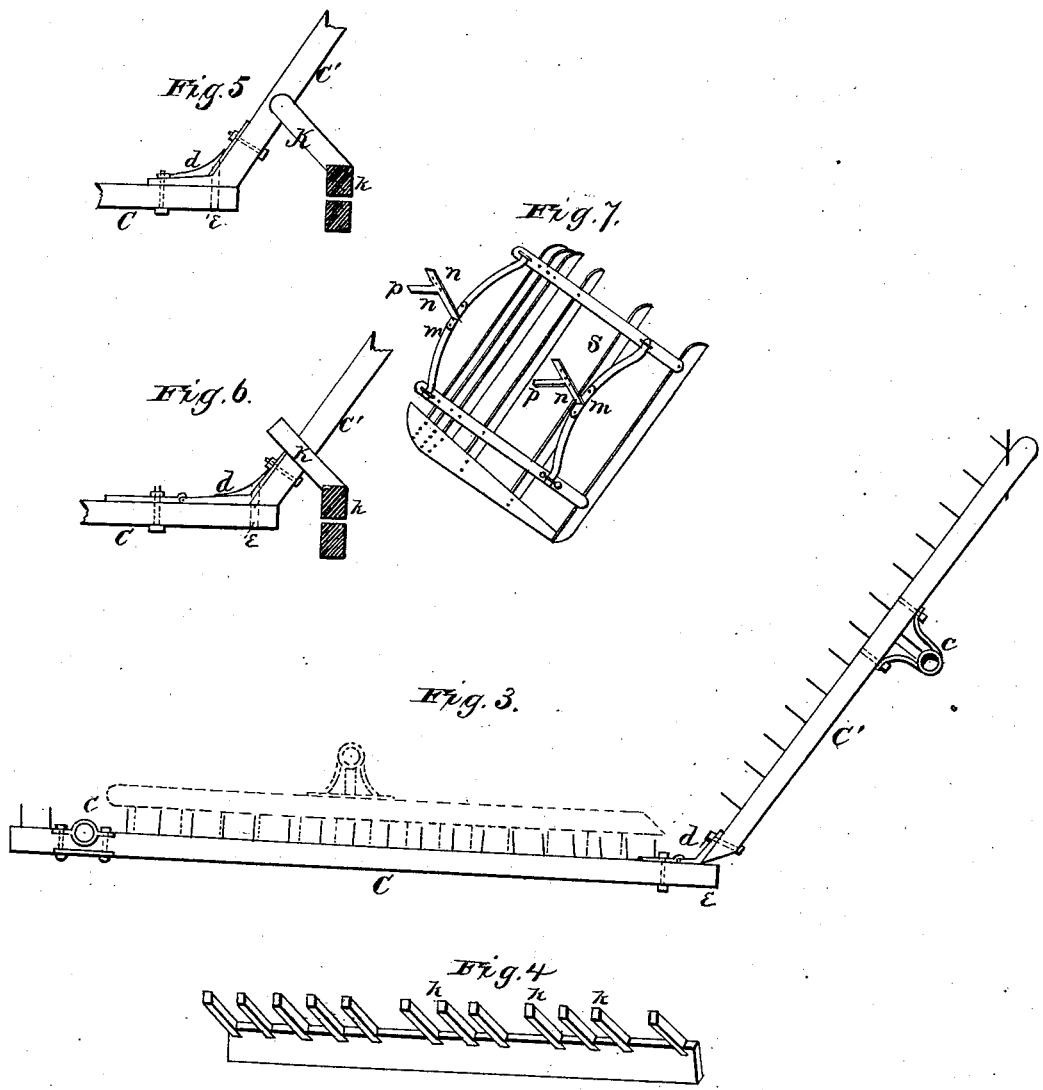
D. SAGER.
Harvester.
No. 207,554. Patented Aug. 27, 1878.

UNITED STATES PATENT OFFICE.

DANIEL SAGER, OF OMAHA, NEBRASKA.

IMPROVEMENT IN HARVESTERS.

Specification forming part of Letters Patent No. 207,554, dated August 27, 1878; application filed August 24, 1877.

*To all whom it may concern:*

Be it known that I, DANIEL SAGER, of Omaha, in the county of Douglas and State of Nebraska, have invented certain new and useful Improvements in Harvesters; and I do hereby declare the following to be a full, clear, and exact description thereof, reference being had to the accompanying drawings, and to the letters of reference marked thereon.

My invention relates to harvesters; and it consists in the construction and arrangement of the rakes and a guide for separating the rakes, all as hereinafter more fully set forth.

In order to enable others skilled in the art to which my invention appertains to make and use the same, I will now proceed to describe its construction and operation, referring to the annexed drawings, which form a part of this specification, and in which—

Figure 1:
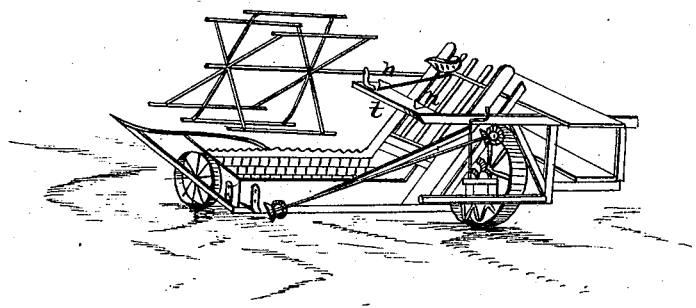
Figure 2:
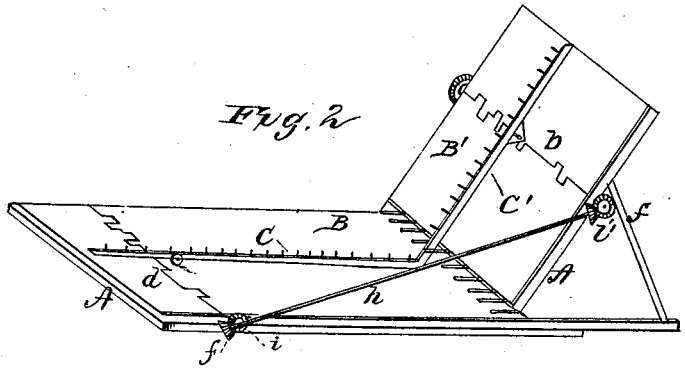

Figure 1 is a perspective view of a harvester embodying my invention. Fig. 2 is an enlarged perspective view of the platform, with rakes and guide. Fig. 3 is an enlarged side view of one of the rakes. Fig. 4 is a perspective view of the guide. Figs. 5 and 6 are detailed views of a rake and guide. Fig. 7 is a perspective view of the press-rake.

A represents the frame-work of that class of harvesters in which the cut grain falls upon a horizontal platform, and is carried to the inner end thereof, and then elevated a suitable distance to be discharged onto a binders' table. B represents the horizontal slotted platform, and B' is the inclined extension thereof, over which the grain is elevated. In this platform is arranged a series of pairs of rakes, arranged upon two crank-shafts, $a$ and $b$, the shaft $a$ being placed in suitable bearings under the part B of the platform, and a suitable distance from its outer end, while the shaft $b$ is placed in bearings about midway under the inclined part B' of the platform.

Each rake is composed of a horizontal part, C, and inclined part C', and these are, by suitable boxing $c\ c$, connected to the cranks, respectively, of the two shafts $a$ and $b$. The two parts of the rake consist simply of straight bars, with a series of teeth projecting from the same; and the two rakes are united together by means of a hinge, $d$, in the manner shown in Fig. 3, and a small guide-bar, $e$, projects from the lower end of the rake C' into a slot in the inner end of the rake C, to take away any lateral strain on the hinge. By thus dividing each rake into two parts, and uniting the two parts by a hinge, the rake constantly accommodates itself, by contracting and expanding, to any uneven surface over which the platform may pass, and thereby securing a light and uniform draft to the machine. It also enables the machine to be more quickly, accurately, and easily set up, and allows the rakes to be neatly and economically folded for transportation, as shown by dotted lines in Fig. 3.

The shafts $a$ and $b$ are, upon their rear ends, provided with bevel-gear wheels $f\ f$, which mesh with corresponding bevel-gear wheels $i\ i$ upon the ends of an inclined shaft, $h$, and the power being applied, in the usual manner, to the front end of the shaft $b$, the shaft $a$ also obtains the required rotary motion.

At the angle of the two parts of the platform is located a guide, consisting of a cross-bar, K, provided with inclined bars $k\ k$, between which the rakes work. These bars or guides form a stationary part of the machine to separate the rakes.

Heretofore, in this class of machines, the rakes were kept apart by pieces of wood nailed upon the inside of each pair of rakes. When it became necessary to replace a section of a rake this piece would be destroyed in removing it. Again, these rakes were usually made in pairs, right and left hand, and the blocks which made the guides and supported the rakes were nailed on at the factory, thus making necessary double the amount of stock for repairs and breakage required by the use of my guide, which allows all rakes to be either right or left hand.

L represents the press-rake, which is suspended at right angles, at any desired distance above the elevator or grain-conveyer, by means of the springs $m\ m$ and rods or straps $n\ n$. The ends of the springs are secured to the press-rake, and the straps $n$ fastened to the springs at or near the centers of the springs.

The springs $m$ have sufficient elasticity to adjust the rake with a uniform action to such uneven thickness of grain as may be required to pass under the press-rake.

The press-rake L is suspended from any suitable part of the frame by means of angle-irons $p$, to which the straps $n$ are fastened by means of bolts $s$, said bolts passing through slots in the straps $n$, so that the rake can be adjusted in any manner desired—that is to say, the rake can be raised or lowered to regulate the distance between the rake and the elevator to either light or heavy grain.

It will be noticed that the press-rake L is at no time allowed to rest its weight on the elevator, which would, if permitted, cause great and unnecessary noise, wear, and friction.

Having thus fully described my invention, what I claim as new, and desire to secure by Letters Patent, is—

1. In a harvester, the rake made in two parts, C C′, operated by two crank-shafts, and the two parts of the rake connected together by a hinge, $d$, substantially as and for the purposes herein set forth.

2. The combination, in a harvester, of the rake C C′, made in two parts, hinged together as described, and shafts $a\ b$, with a series of cranks, to which the rakes are connected, the connecting-shaft $h$, and the bevel-gears $i\ i$ and $f\ f$, all substantially as and for the purposes herein set forth.

3. The cross-bar K, provided with a series of inclined guide-bars, $k$, which project between the rakes, as and for the purposes set forth.

DANIEL SAGER.

Witnesses:
F. D. COOPER,
W. F. MANNING.